Jan. 24, 1967   S. FICSUR ETAL   3,299,867
VANE TYPE INTERNAL COMBUSTION ENGINES
Filed Oct. 22, 1964   5 Sheets-Sheet 3

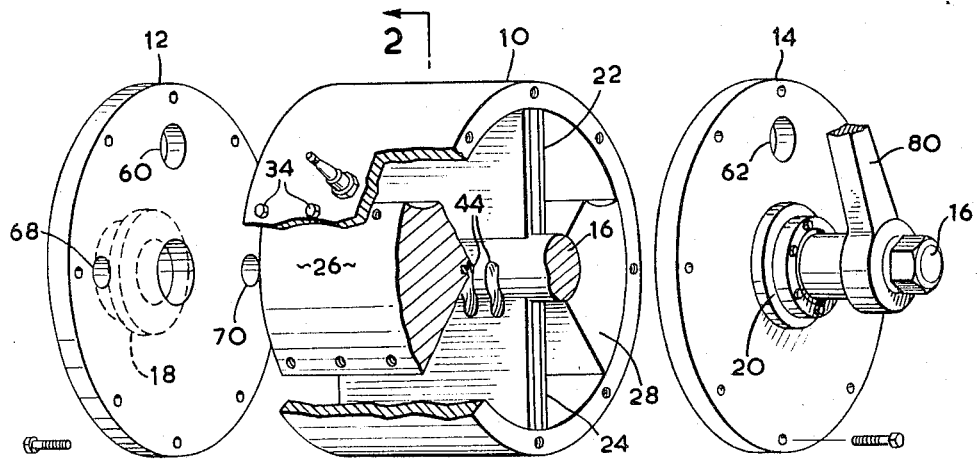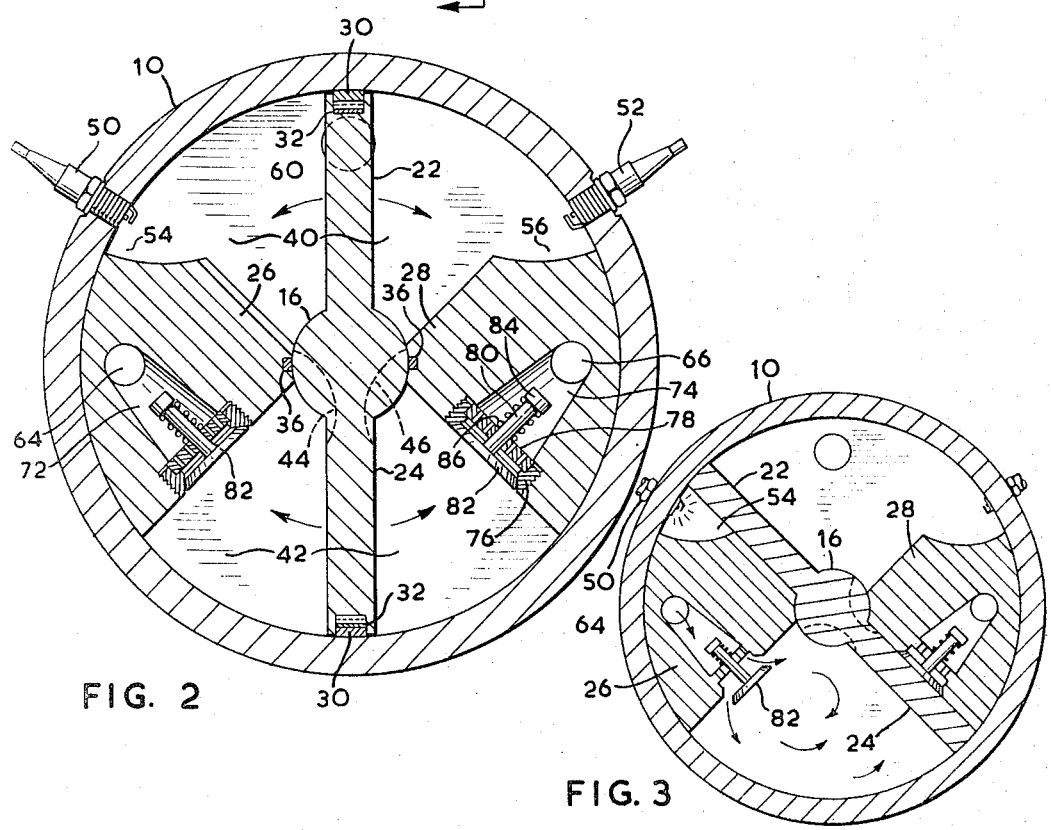

*INVENTOR.*
SANDOR FICSUR
LORNE P. WINTERS
BY~ *Fetherstonhaugh & Co.*
ATTORNEYS United States Patent Office 3,299,867
Patented Jan. 24, 1967

3,299,867
VANE TYPE INTERNAL COMBUSTION ENGINES
Sandor Ficsur, Toronto, Ontario, Canada, and Lorne P. Winters, 44 Dunfield Ave., Toronto, Ontario, Canada; said Ficsur assignor to said Winters
Filed Oct. 22, 1964, Ser. No. 405,709
3 Claims. (Cl. 123—18)

This invention relates to the construction of vane type internal combustion engines and is particularly concerned with an engine of this type that is characterized by vane movements which are cyclic rather than fully rotational.

During recent years there have been proposed many engine designs intended to replace the well known reciprocating piston type of internal combustion engine. The majority of these proposals have taken the form of a cylindrical casing enclosing a rotor which is either mounted eccentrically or carries radially extending vanes. They are based on the operating principle that as the rotor revolves, it periodically defines one or more chambers in which a fuel mixture can be exploded so that the exploding mixture drives the rotor. Engines of this general configuration and operating on this principle have become known in the trade as "rotary engines" and while they have the advantage of simplicity, they have certain inherent disadvantages with the result that only one or two of these types of engines have now reached practical development.

The inherent disadvantages of the "rotary engine" principle largely stem from the difficulty of clearly defining compression and expansion chambers with a rotor revolving at high speeds.

It is, therefore, a primary object of this invention to provide an internal combustion engine which has the simplicity of the rotary engine, thereby avoiding the complexities of the reciprocating piston type engine, while avoiding the inherent disadvantages of the rotary engine principle.

It is a more specific object of the invention to provide a simplified engine in which the areas of compression and expansion of the fuel mixture are precisely defined.

These and other objects of the invention are achieved by providing a vane type engine in which the vanes and the shaft to which they are attached go through cyclic movements rather than fully rotational movements. The engine may be broadly defined as consisting of a cylindrical casing enclosing a flutter vane wherein the output power of the engine takes the form of cyclic rotation of an output shaft or shafts.

The invention will be more thoroughly understood from the following description of two preferred embodiments thereof as read in conjunction with the accompanying drawings.

In the drawings,

FIGURE 1 is an exploded perspective view, somewhat broken away, of a first embodiment of the invention and showing a form of the engine in accord with the invention operating on a two-stroke principle;

FIGURE 2 is a cross-sectional view taken along the line 2—2 of FIGURE 1;

Figure 8:
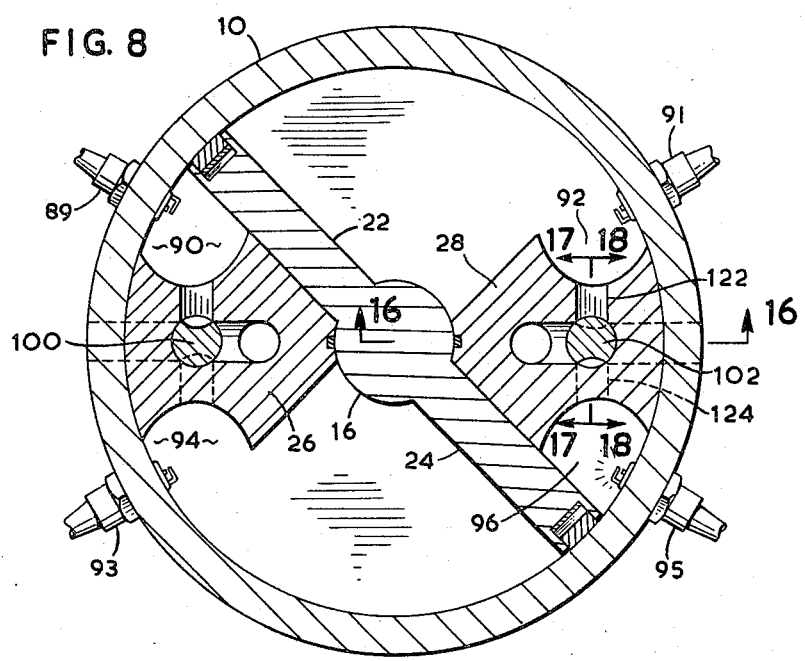
Figure 16:
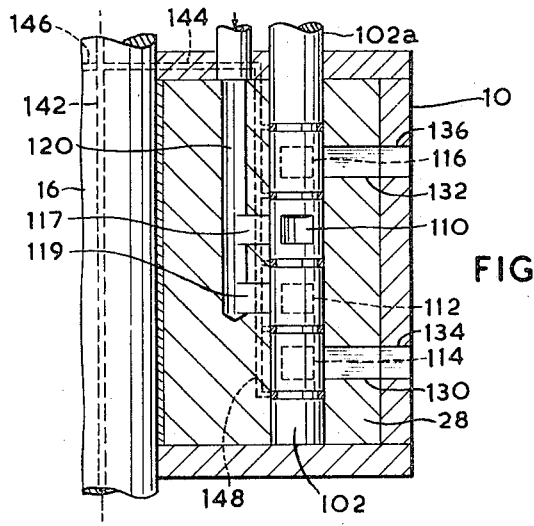
Figure 17:
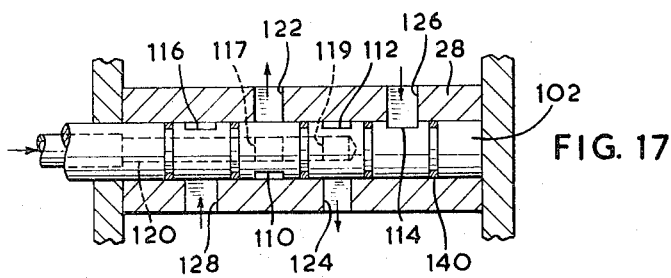
Figure 18:
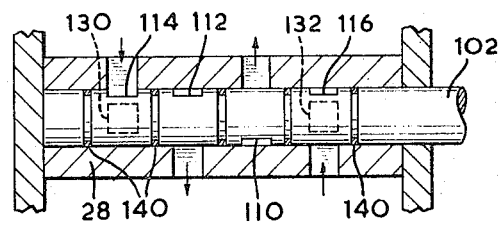
Figure 19:
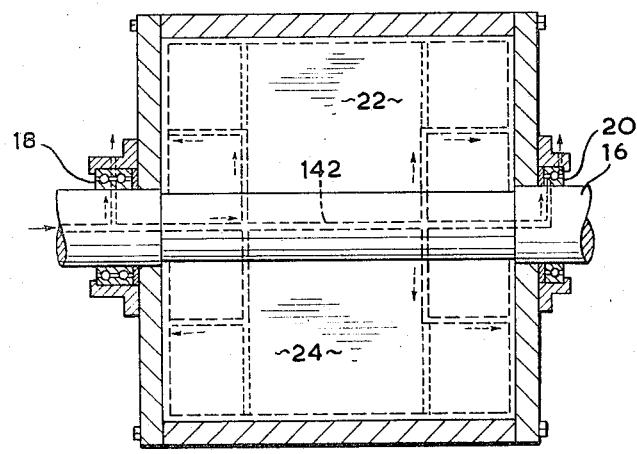

FIGURES 3 to 7, inclusive, are cross-sectional views similar to FIGURE 1 and showing the relative position of the various moving parts of the engine during a full cycle;

FIGURE 8 is a cross-sectional view similar to FIGURE 2 but illustrating a second embodiment of the invention operating on a four-stroke principle;

FIGURES 9 to 15, inclusive, are cross-sectional views of the engine illustrated in FIGURE 8 and showing the relative position of the moving parts of the engine over a four-stroke cycle;

FIGURES 16, 17 and 18 are cross-sectional views taken along the lines 16—16, 17—17 and 18—18, respectively, of FIGURE 8; and FIGURE 19 is a longitudinal cross-sectional view through the centre of the engine shown in FIGURE 8 and illustrating one arrangement for lubricating the engine.

As can be appreciated from the above, the two illustrated embodiments of the invention differ from each other in that the embodiment illustrated in FIGURES 1 to 7 operates on a two-stroke principle, while the embodiment illustrated in FIGURES 8 to 19 inclusive operates on a four stroke principle. The terms "two-stroke" and "four-stroke" are adapted from the terminology applied to reciprocating piston engines as a matter of convenience to distinguish between the two explosion cycles involved with a cycle being broadly defined as the sequence of events between two explosions taking place on the same side of any particular vane. However, it is to be understood that the terms "two-stroke" and "four-stroke" are not strictly applicable as the movements of the vanes are not "strokes" in the sense that they take place along straight lines as they are actually movements through an arc.

Referring to FIGURE 1, the illustrated first embodiment of the invention essentially consists of a cylindrical casing 10 having a pair of end walls 12 and 14 which preferably take the form of removable plates, a central shaft 16 mounted coaxially within the casing and supported in bearings 18 and 20 carried by the end walls, a pair of vanes 22 and 24 carried by shaft 16 and a pair of opposed blocks 26, 28.

Vanes 22 and 24 may be formed integrally with shaft 16 or they may be separate items which are rigidly attached to the shaft. In either case, the vanes are in sealing engagement with the inside surface of casing 10 and the inside surfaces of end walls 12 and 14. This seal can be effected in various known ways and as shown best in FIGURE 2, the seals can comprise strips 30 of hardened and polished steel which are urged outwardly by steel spring strips 32. This sealing arrangement is comparable to the common piston ring arrangement employed on the pistons of reciprocating engines.

The blocks 26 and 28 are rigidly fixed to the inside surface of the casing as by machine screws 34 or the like, although they could be rigidly attached to the inner wall of the casing by other means. The radially inner ends of blocks 26 and 28 are shaped to snugly receive shaft 16 and to ensure fluid-tight seal between the blocks and the outer surface of the shaft, there may be employed a pair of suitable sealing strips 36.

Blocks 26 and 28 have the effect of dividing the interior of casing 10 into two chambers 40 and 42. With the vanes in the position shown in FIGURES 1 and 2, these chambers 40 and 42 are sealed from one another. However, with movement of the vanes, a fluid intercommunication between the chambers is effected through two series of grooves 44 and 46 which are formed partially in the outer surface of shaft 16 and partially in the outer surfaces of vane 24.

At opposite sides of the chamber 40, there are arranged a pair of sparking devices 50 and 52 which can constitute the well known spark plugs. Adjacent the sparking devices, the blocks 26 and 28 are cut away to provide longitudinally extending compression chambers 54 and 56.

Chamber 40 also includes some means for exhausting the products of combustion, such as ports 60 and 62 in the end walls 12 and 14. In this case, the products of combustion pass out through the exhaust ports after vane 22 has moved past same.

Gaseous fuel is fed to chamber 40, or more specifically the compression chambers 54 and 56, through the grooves 44 and 46 from chamber 42. The fuel might be introduced into the latter chamber in several ways but, as illustrated, this is done by providing passages through the blocks 26 and 28 with the inner ends of the passages terminating at the chamber 42 and the outer ends of the passages being connected to a source of gaseous fuel. These passages consist of longitudinally extending bores 64 and 66 which include the ports 68 and 70 through the end wall 12 and the transverse bores 72 and 74, whose inner ends are normally closed by spring valves. The valves may consist of threaded inserts including an outer ring 76, a transverse perforated web 78 supporting a spindle 80, having a valve head 82, a shoulder 84 and surrounded by a coil spring 86.

It is to be noted by reference to FIGURE 1 that the grooves 44 (and 46) are arranged in planes lying at right angles to the longitudinal axis of the shaft. However, it may be advantageous to have the grooves slanted towards the spark plugs so as to avoid, as much as possible, loss of fresh fuel out the exhaust ports 60 and 62.

While the operation of the first embodiment of the invention is fully described below, it will be now appreciated that power is derived by alternate explosion of a fuel mixture in compression chambers 54 and 56 as to cause the vanes to "flutter" back and forth from one compression chamber to the other. Shaft 16, therefore, moves through cyclic rotation rather than full rotation. For most end uses of this power, it is desirable to translate this cyclic rotation into full rotation. This could be done in several ways which would be clear to those skilled in the mechanical art. By way of example, one or both ends of shaft 16 might be connected to a crank arm, such as the arm 80 shown in FIGURE 1, with the outer end of the arm being connected to a connecting rod which, in turn, would be connected to a crank throw.

Figure 4:
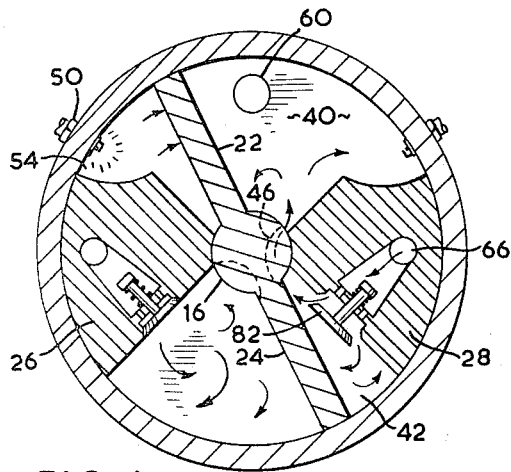
Figure 5:
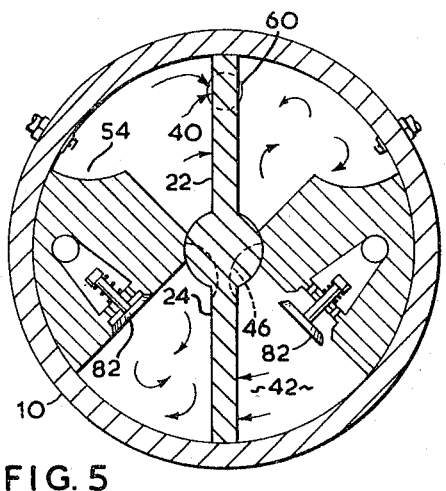
Figure 6:
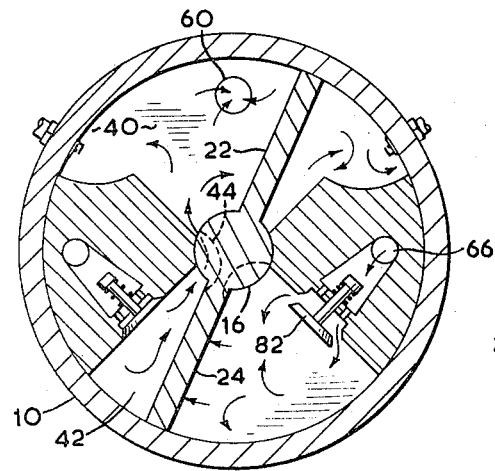

The embodiment of FIGURES 1 to 7, inclusive, operates in the following manner:

Referring to FIGURE 3, vane 22 has fully compressed a fuel mixture in combustion chamber 54 and a spark from spark plug 50 is igniting this compressed mixture. The resultant rapid burning of the mixture forces vane 22 to the right as shown in FIGURE 4. Simultaneously, vane 24 is moving away from the valve contained in block 28 so that this valve is opened, allowing fuel to enter chamber 42 and subsequently to enter chamber 40 through the grooves 46 in the outer surface of shaft 16. Accordingly, as the burning gases are expanding in the left-hand side of chamber 40, a fresh fuel mixture is being introduced into the right-hand side. As vane 22 moves past exhaust port 60, the products of combustion resulting from the burning of the fuel mixture in compression chamber 54 flow out the exhaust port and aiding in this exhaust is the pressure exerted on the burnt products of combustion by the incoming fresh fuel supply through grooves 44. It is to be also noted in FIGURE 4 that with vane 24 moving towards the valve in block 26, this valve is closed so that there is not a direct connection between the source of fuel and the upper chamber 40 as such a connection might result in the loss of considerable fresh fuel out the exhaust port 60.

Figure 7:
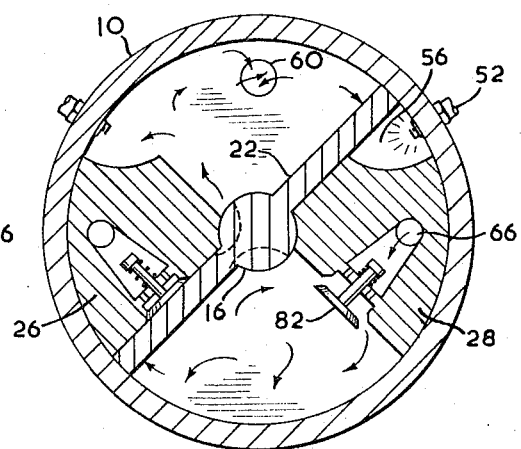

In FIGURE 7, vane 22 has fully compressed the fuel in compression chamber 56. Following ignition by spark from plug 52, vane 22 will be forced to the left, as shown in FIGURE 7, with the sequence of events just described taking place in the opposite sense. It can be seen, therefore, that the engine operates to drive vane 22 back and forth between the compression chambers 54 and 56, thereby causing the cyclic rotation of the shaft.

With the embodiment of FIGURES 1 to 7 inclusive, which employs the two-stroke principle, lubrication will be achieved in the same manner as is now done with two-stroke reciprocating engines, i.e. by the addition of oil to the fuel mixture. However, lubrication might be achieved by the feeding of lubricating oil between the various moving parts in the same manner illustrated with respect to the four-stroke embodiment illustrated in FIGURES 8 to 17.

Referring now to FIGURE 8, the second embodiment of the invention is similar to the first in essential respects. A cylindrical casing 10 encloses an interior space divided into two chambers by blocks 26 and 28 and employs similar end walls or plates supporting a longitudinal shaft carrying a pair of opposed vanes 22 and 24. However, in the four-stroke embodiment, there are four spark plugs 89, 91, 93 and 95 and the blocks 26 and 28 are cut away to provide four compression chambers 90, 92, 94 and 96. Further, there is provided a different arrangement of ports and the like for feeding fuel to the compression chambers.

The particular fuel metering arrangement illustrated essentially consists of two spindle valves 100 and 102 mounted within the blocks 26 and 28 generally parallel with shaft 16. The spindles are driven by the engine itself so that each spindle includes an extension which projects through one of the end walls or plates of the casing for geared connection with the final output shaft of the engine, i.e. the shaft which is continuously rotated following translation of the cyclic rotation of shaft 16 into full rotation. In result, the spndles 100 and 102 are continuously rotated and through the arrangement of a number of grooves in the outer surfaces of the spindles and connecting bores through the blocks, fuel is fed to each of the compression chambers as required while products of combustion are exhausted.

It is here to be understood that the particular illustrated arrangement consisting of the spindle valves 100 and 102 for metering fuel and carrying off exhaust is a preferred expedient and that other arrangements might be used to accomplish the same objects.

To describe the operation of the illustrated spindle type of fuel metering and exhaust arrangement, reference is made to FIGURE 16. As previously mentioned, the spindle 102 includes an extension 102a which is connected to the final output shaft, whereby the spindle might be continuously rotated about its longitudinal axis.

The spindle carries recessed grooves in its outer surface which have the function of interconnecting the various ports to be described as the spindle rotates. As illustrated, there are four grooves in each spindle, three of which are aligned along one side of the spindle with the fourth being positioned substantially diametrically opposite the others. Variations on this particular arrangement of the grooves would be possible.

The spindle illustrated in FIGURES 16, 17 and 18 is the one positioned in block 28. Grooves 110 and 112 have the function of feeding fuel mixture to compression chambers 92 and 96 respectively, while grooves 114 and 116 serve to permit exhaust flow from these chambers. To this end, the grooves 110 and 112 are aligned with passages 117 and 119 which connect with the longitudinal bore 120 in block 28. They also are aligned with the transverse inlet bores 122 and 124 through block 28 which lead to the compression chambers 92 and 96. Thus, as the spindle rotates, groove 110 periodically connects bore 120 with compression chamber 92 while groove 112 periodically connects bore 120 with compression chamber 96. Of course, it is to be understood that bore 120 is connected with a source of fuel mixture. Rotation of the spindle also periodically brings grooves 114 and 116 into simultaneous registry with transverse exhaust bores 126 and 128 in block 28 and exhaust bores 130 and 132 through the side of block 28 and their associated passages 134 and 136 through the casing. Thus, there is provided temporary passages for the exhaust of products of combustion.

The other spindle in block 26 is similarly constructed to the one just described. In both cases, a plurality of sealing rings 140 are fixed to the outside surface of the spindles to ensure that the various fuel admitting and combustion product channels are not inadvertently interconnected. As a further preferred expedient, the outside surfaces of the spindles are provided with a number of longitudinally extending seals. It is also to be noted that the grooves and the various ports which they interconnect are substantially square or rectangular rather than round.

The second embodiment of the invention operates similarly to the first with the exception that there are vane movements which serve only to exhaust the products of combustion, i.e. the second embodiment works on the "four-stroke" principle.

Figure 9:
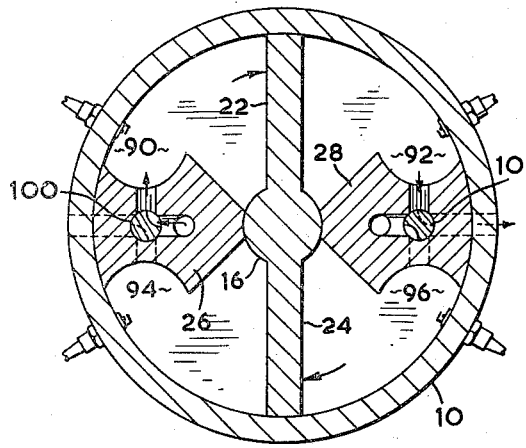
Figure 10:
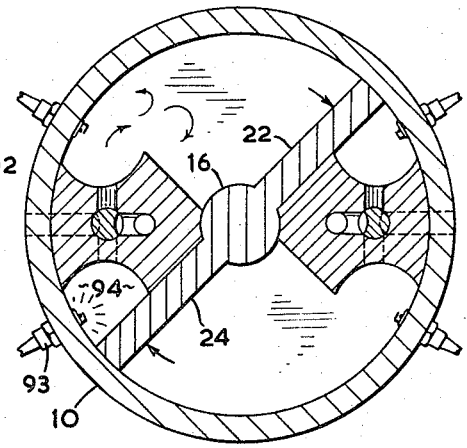
Figure 11:
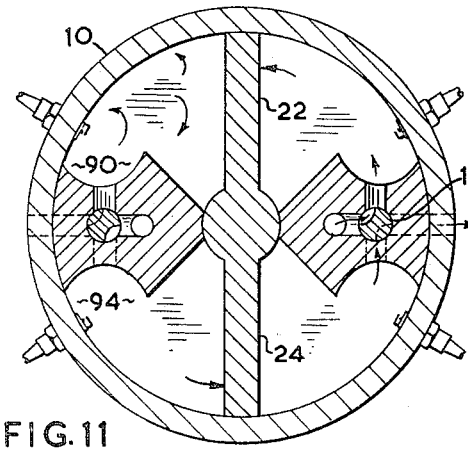
Figure 12:
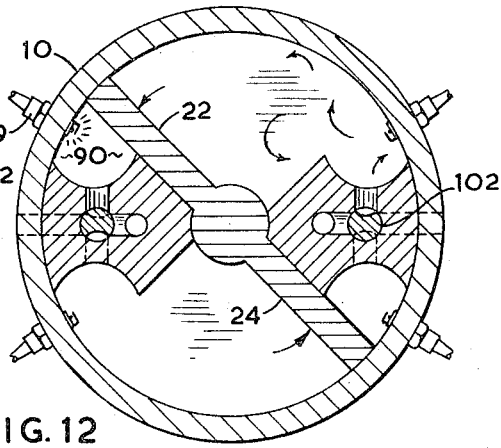
Figure 13:
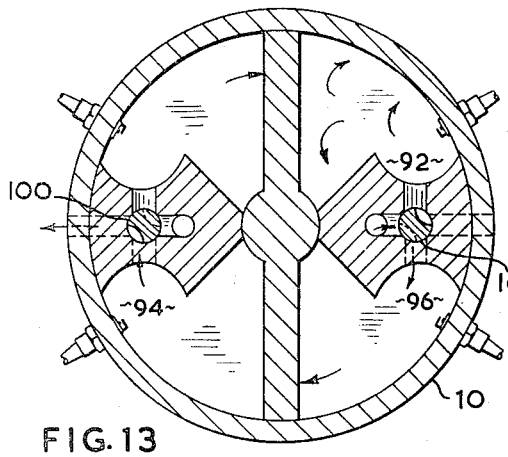
Figure 14:
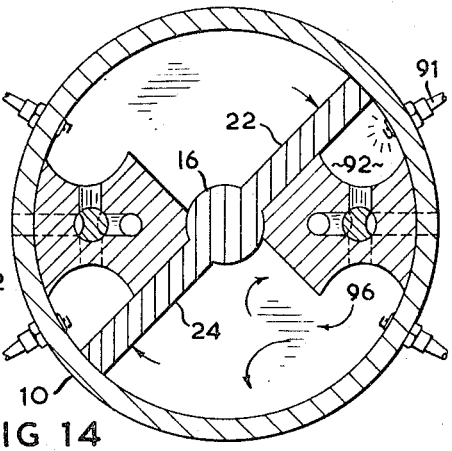
Figure 15:
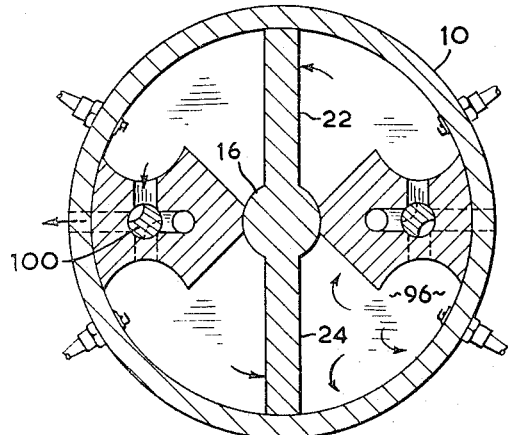

In FIGURE 8, plug 95 is just exploding a compressed fuel mixture in chamber 96. This will force vane 24 to the left in FIGURE 8 as shown in FIGURE 9. As this happens, the two spindle valves are rotated as to feed a fuel mixture to chamber 90 while permitting exhaust to flow from chamber 92 in which an explosion has taken place just prior to the explosion in chamber 96. Following explosion in chamber 94, vane 22 compresses the fuel mixture just introduced in chamber 90 so that when this mixture is fully compressed as shown in FIGURE 12, this particular compressed mixture is exploded.

Lubrication in the second embodiment may be achieved by the arrangement shown in FIGURE 17. The lubricating oil is fed through a longitudinal bore 142 in the shaft and there is provided several interconnecting bores leading to the interfaces where lubrication is desirable, including interfaces in the bearings 18 and 20. Lubrication at the outer ends of the vanes is achieved through the outward flow of lubricating oil under centrifugal force along the side margins of the vanes. Lubrication of the spindles can also be achieved through bores 144 and 146 in the end plates which connect with a longitudinal bore 148 in block 28 and a similar bore in block 26.

The engine in accord with the invention may be either water or air cooled. Further, while both embodiments described are operative with gasoline and employ spark plugs for ignition, it should be understood that this engine may be operated on the diesel princple wherein the fuel mixture is exploded by the heat generated during its compression.

What we claim as our invention is:

1. An internal combustion engine producing power output in the form of cyclical rotation of an output shaft, comprising, a cylindrical casing having end walls, a shaft extending coaxially through the casing and mounted for rotation in bearings carried by said end walls, said shaft being extended beyond at least one of said end walls for connection to a power take-oc assembly, a pair of vanes fixed to said shaft within said casing, said vanes being in sealing sliding engagement within the inside surfaces of said casing and end walls, a pair of block members extending inwardly from the inside surface of the casing to said shaft and dividing the interior of said casing into two chambers, longitudinally extending recesses formed in said block members and defining compression chambers at opposite sides of one of said chambers, means for igniting fuel mixtures in said compression chambers, exhaust means for removing products of combustion from said one chamber, and fuel inlet means for introducing fuel to said one chamber, said fuel inlet means consisting of a pair of fuel passages through said block members, with the inner ends of said passages terminating in the other of said chambers, the outer ends of said passages terminating at connections to a source of gaseous fuel, said fuel inlet means further including grooves formed in the outer surface of said shaft, said grooves being shaped and sized to interconnect said two chambers.

2. An engine as claimed in claim 1 in which said passages through said block members are provided with one way spring valves adapted to be opened by the suction creating effect of the vane in said second chamber as it moves away from said valves and adapted to close automatically as said latter vane moves towards said valves.

3. An engine as claimed in claim 1 in which said exhaust means comprises a port in at least one of said end walls, said port being positioned substantially midway between said sparking devices.

References Cited by the Examiner

UNITED STATES PATENTS

| 725,087 | 4/1903 | Jenney | 123—18 |
| 1,010,583 | 12/1911 | Carmichael et al. | 123—18 |
| 1,037,094 | 8/1912 | Williams | 123—18 |

FOREIGN PATENTS

| 814,026 | 3/1937 | France. |
| 35,340 | 7/1922 | Norway. |
| 47,175 | 7/1917 | Sweden. |

MARK NEWMAN, *Primary Examiner.*

WENDELL E. BURNS, *Examiner.*